United States Patent
Vorenkamp et al.

(10) Patent No.: US 7,385,163 B2
(45) Date of Patent: Jun. 10, 2008

(54) FUEL TANK ASSEMBLY AND METHOD OF ASSEMBLY

(75) Inventors: Erich J. Vorenkamp, Pinckney, MI (US); Kale S. Schulte, Canton, MI (US); Richard A. Knaggs, Ottawa Lake, MI (US); Ryan F. Sekela, Ypsilanti Township, MI (US); Mark A. Harris, Dexter, MI (US)

(73) Assignee: Automotive Componets Holdings, LLC, Dearborn, MI (US)

( * ) Notice: Subject to any disclaimer, the term of this patent is extended or adjusted under 35 U.S.C. 154(b) by 0 days.

(21) Appl. No.: 11/592,857

(22) Filed: Nov. 3, 2006

(65) Prior Publication Data

US 2007/0051730 A1     Mar. 8, 2007

Related U.S. Application Data

(62) Division of application No. 10/734,064, filed on Dec. 11, 2003, now abandoned.

(51) Int. Cl.
*B23K 13/01*     (2006.01)
*F16L 13/02*     (2006.01)

(52) U.S. Cl. ..................... 219/617; 285/21.2

(58) Field of Classification Search ............... 219/617, 219/616, 602, 603, 659; 285/21.2, 21.1; 156/158, 166, 304.2, 380.2

See application file for complete search history.

(56) References Cited

U.S. PATENT DOCUMENTS

| 4,224,494 A | * | 9/1980 | Reboux et al. ............ 219/615 |
| 7,204,520 B2 | * | 4/2007 | Mueller et al. ............ 285/21.1 |
| 2002/0160248 A1 | | 10/2002 | Takao et al. |

FOREIGN PATENT DOCUMENTS

| EP | 1 046 723 A1 | 10/2000 |
| EP | 1 235 290 A2 | 8/2002 |
| JP | 04-358044 A | 12/1992 |
| JP | 11-197704 A | 7/1999 |
| JP | 2000-239806 A | 9/2000 |
| JP | 2003-234109 A | 8/2003 |
| JP | 2003-317735 A | 11/2003 |

* cited by examiner

*Primary Examiner*—Daniel L Robinson
(74) *Attorney, Agent, or Firm*—MacMillan, Sobanski & Todd, LLC

(57) ABSTRACT

A method is provided for attaching a component to a fuel tank having a wall defining a tank cavity, an inner surface, an outer surface, and an access opening extending through the wall. The component is placed in contact with the inner surface of the fuel tank. The component is inductively welded to the inner surface of the fuel tank by an emitter coil disposed exterior of the fuel tank.

8 Claims, 4 Drawing Sheets

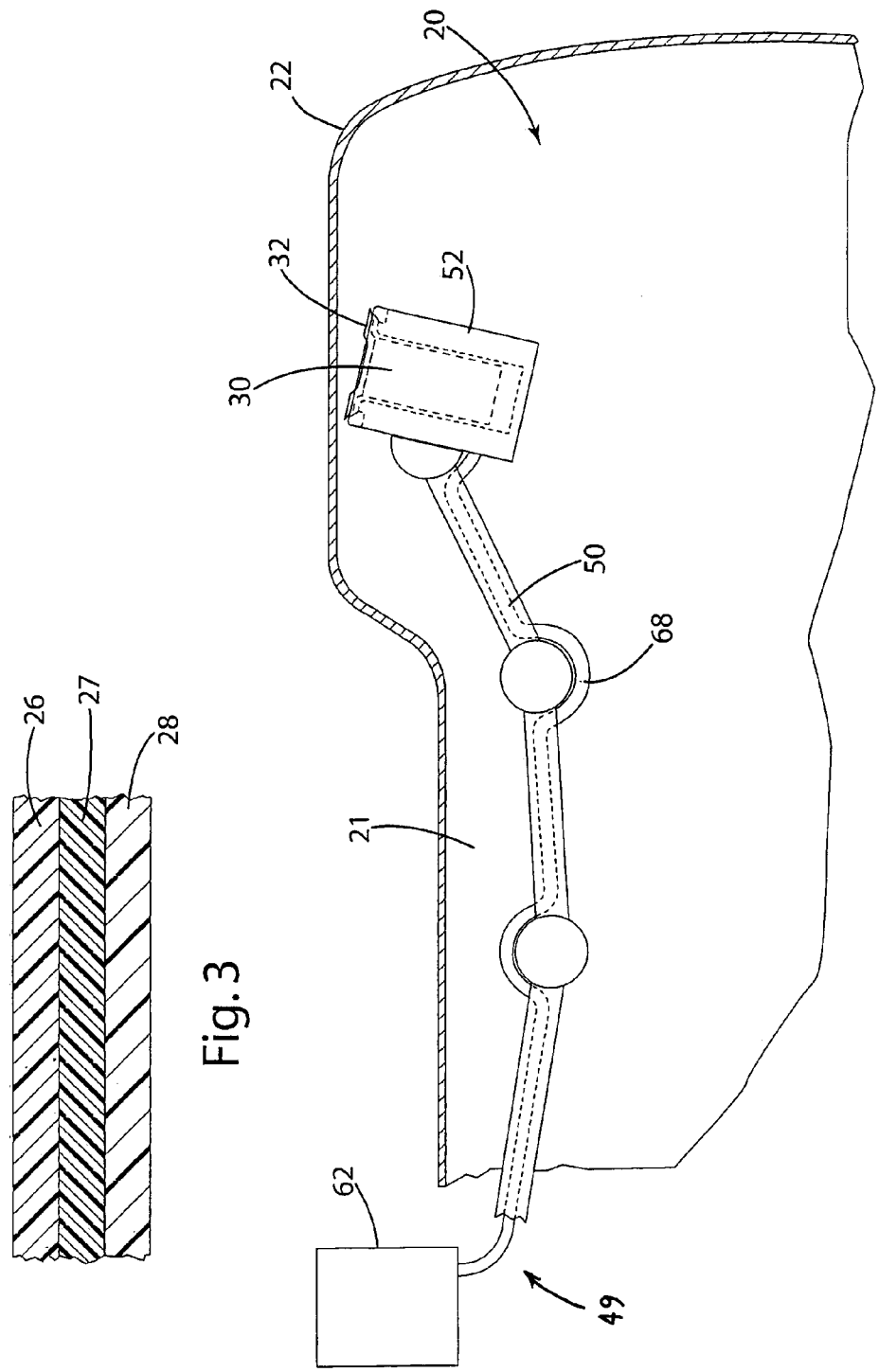

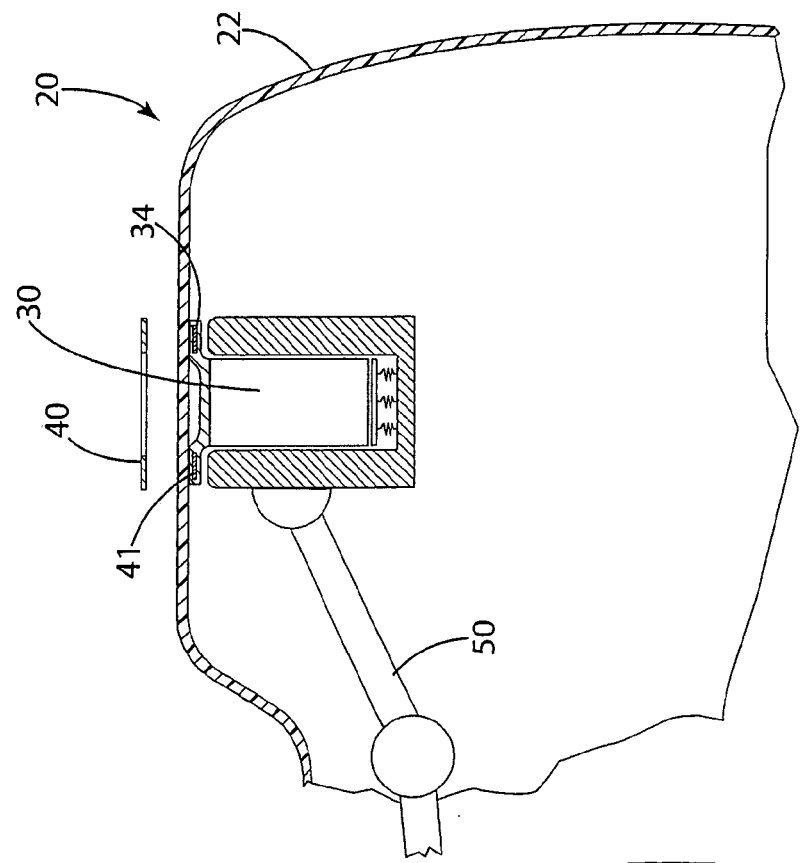
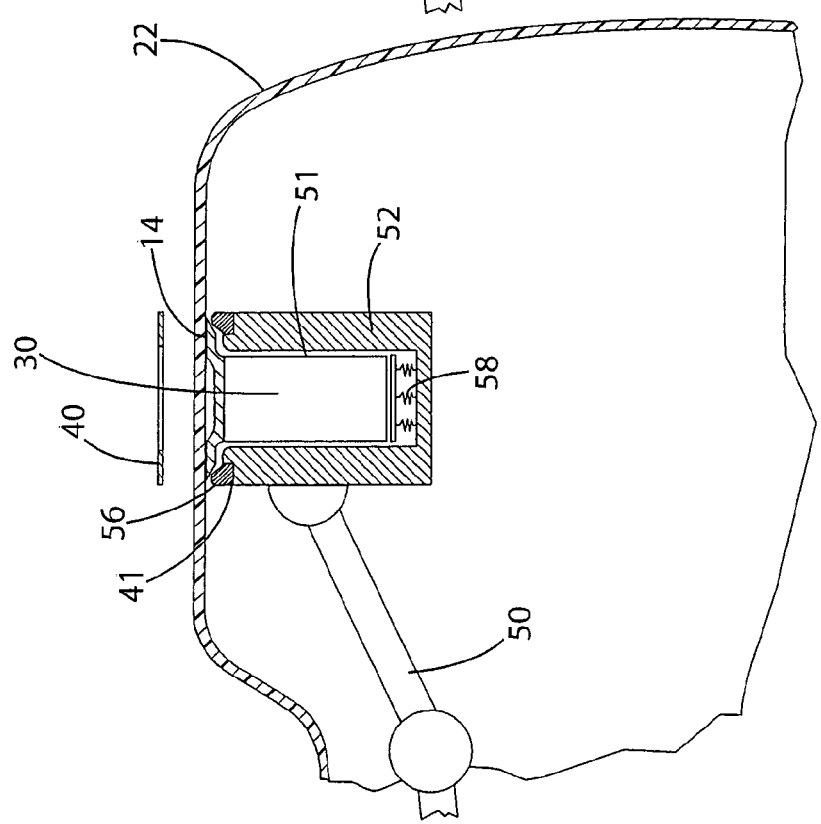

FUEL TANK ASSEMBLY AND METHOD OF ASSEMBLY

CROSS-REFERENCE TO RELATED APPLICATIONS

This application is a divisional application of and claims priority to application Ser. No. 10/734,064 filed Dec. 11, 2003 now abandoned.

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISC APPENDIX

Not Applicable

BACKGROUND OF THE INVENTION

1. Field of Invention

The present invention relates to a fuel tank assembly and method of securing a component in a fuel tank using induction welding.

2. Background of Related Art

To save time and money and improve reliability, manufacturers have been switching from metal fuel tanks to thermoplastic fuel tanks. Thermoplastic fuel tanks generally have lower material cost, lower manufacturing costs, increased longevity, and are not subject to corrosion. One problem with thermoplastic fuel tanks is that vapors may permeate through the fuel tanks walls. To address this permeation problem and in view of stricter emissions requirements, manufacturers have added permeation resistant layers to fuel tanks and have attempted to form fuel tanks out of as few pieces as possible.

While permeation resistant layers and blow molded fuel tanks reduce permeation, problems still arise when components, such as fill tubes, vent tubes, roll over valves, and vent valves, are attached to the fuel tank. During attachment many manufacturers drill holes through the wall of the fuel tank and weld the component to the outside of the fuel tank. However, each opening breaches the permeation resistant layer creating permeation pathways.

As an alternative to creating separate holes for each component, some manufacturers have attempted to move the attached components inside the container using a single access hole. In this approach, the component is secured to an interior surface readily accessible from the access hole by directly welding the component to the fuel tank using hot plate welding. In hot plate welding, a plate disposed between the component and fuel tank is heated, typically through resistive heating, until the component is capable of being bonded to the fuel tank and the plate is displaced so that the component may be placed into contact with the fuel tank to form a bond area as the component and fuel tank cool. While this approach reduces the number of potential permeation pathways, the components generally are located approximately opposite the opening within the fuel tank wall in a limited bonding area. The limited bonding area typically includes a pump and fuel level sensor assembly held by spring loaded rods against the bottom of the fuel tank. Attempts to offset the component from the limited bonding area have resulted in prolonged manufacturing cycle times due to the delay in cooling the heating elements used to weld the component to the tank wall before removal from the fuel tank. Further, commonly used heating elements (such as hot plates) have significant mass requiring excessive time to heat and cool the heating element.

In view of the above, a need exists for an apparatus and method having faster cycle times for welding components to an inner surface of a fuel tank and, preferably, for an apparatus and method that permits the component to be secured to a tank surface offset from the access opening.

BRIEF SUMMARY OF THE INVENTION

The present invention relates to a fuel tank assembly and method of securing a component in a fuel tank and to the fuel tank wall using induction welding. The method generally includes the steps of placing the component in contact with the inner surface of the fuel tank and inductively welding the component to the inner surface of the fuel tank. The step of inductively welding the component may further include the steps of energizing an emitter coil to heat an induction receiver positioned in welding proximity to a weld surface of the component and de-energizing the induction coil after the component is welded to the fuel tank. A holder may grip the component and insert the component through the access opening of the fuel tank. The component is generally displaced to a position offset from the access opening, and placed in contact with the inner surface before welding the component to the inner surface. The arm generally manipulates the component to a position in contact with the inner surface at a location offset from the access opening.

A method is provided for attaching a component to a fuel tank having a wall defining a tank cavity, an inner surface, an outer surface, and an access opening extending through the wall. The component is placed in contact with the inner surface of the fuel tank. The component is inductively welded to the inner surface of the fuel tank by an emitter coil disposed exterior of the fuel tank.

Various objects and advantages of this invention will become apparent to those skilled in the art from the following detailed description of the preferred embodiment, when read in light of the accompanying drawings.

BRIEF DESCRIPTION OF THE DRAWINGS

FIG. 4 is a perspective view of the arm holding a component within the fuel tank.

FIG. 5 is an enlarged sectional view of the bond area between the component and fuel tank wall.

FIG. 6 is an alternative enlarged sectional view of the bond area between the component and fuel tank wall.

DETAILED DESCRIPTION OF THE PREFERRED EMBODIMENT

Figure 1:
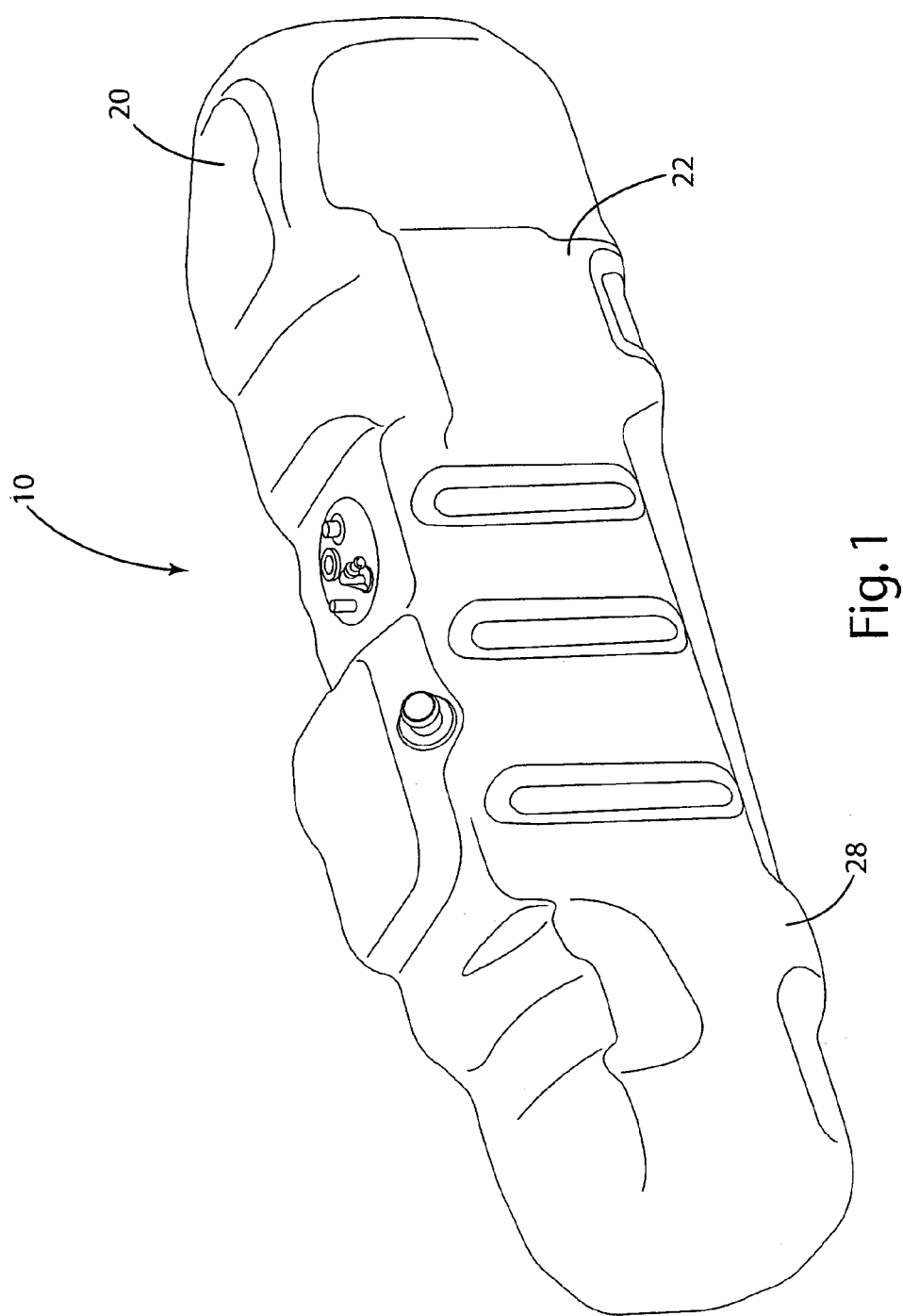
FIG. 1 is a perspective view of a fuel tank.
Figures 2, 3:
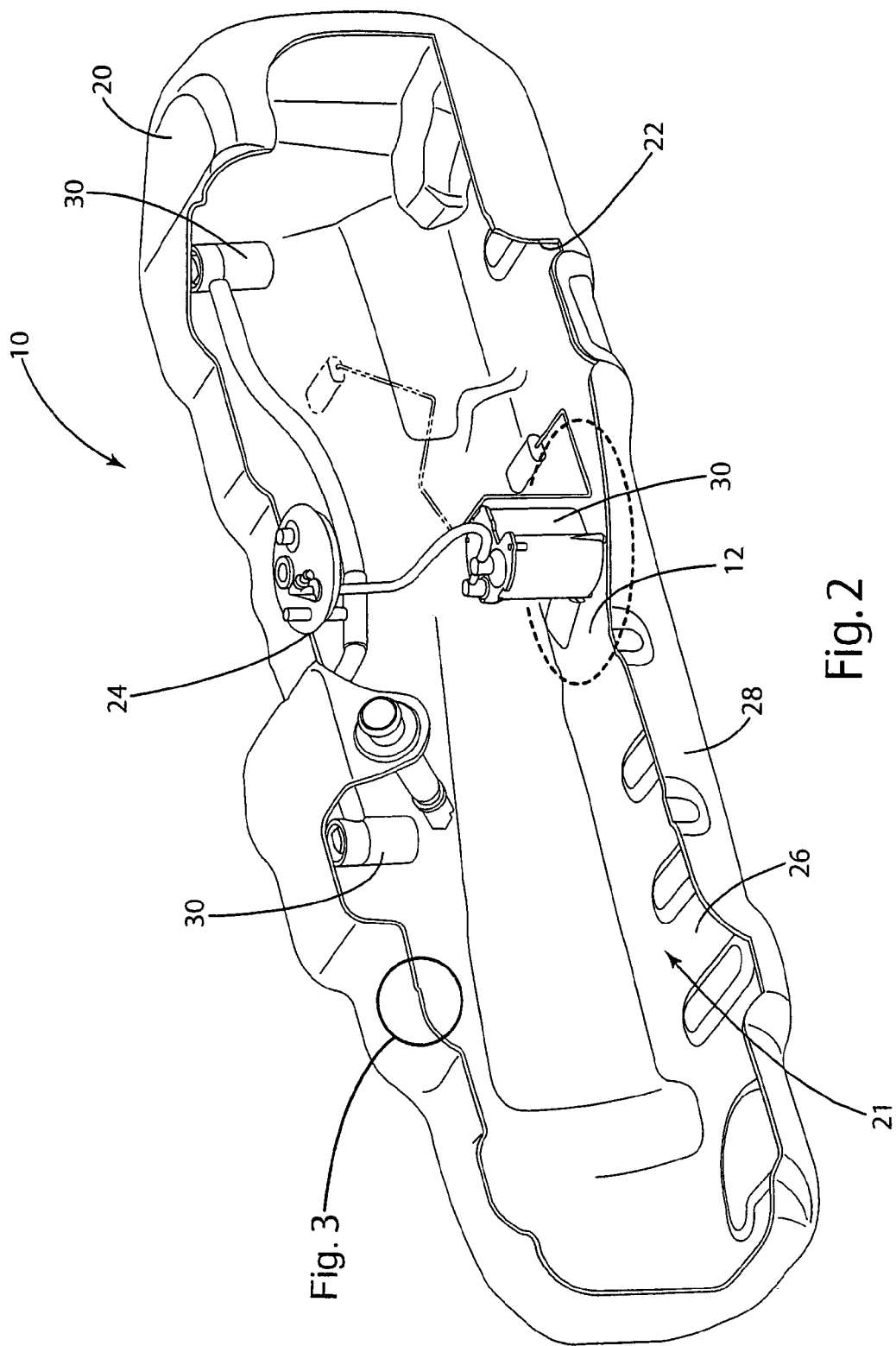
FIG. 2 is a partial sectional view of the fuel tank in FIG. 1.
FIG. 3 is an enlarged sectional view of the fuel tank wall.

A fuel tank assembly 10 constructed in accordance with the illustrated embodiment is shown in FIGS. 1 and 2. The fuel tank assembly 10 generally includes a fuel tank 20 defining an access opening 24 and having an inner surface 26 to which a component 30 is induction welded. Induction welding the component 30 to the fuel tank 20 allows the component to be displaced from the opening 24 without encountering many of the problems typically associated with using a heating element to directly weld the component. Of particular note is that the ability to place the component 30 where desired in the fuel tank, including in areas offset from the access opening 24 provides additional mounting locations, eliminates many packaging concerns and may improve performance of certain components. Induction welding also decreases cycle times by reducing the wait time associated with heating and cooling of conventional heating elements.

A variety of induction welding assemblies may be used to secure components 30 to the fuel tank inner surface 26. In FIG. 4, a representative assembly 49 is illustrated and described herein and generally includes an articulating arm 50 having a holder 52 configured to releasably hold the component. The arm 50 is controllable from the exterior of the tank through conventional techniques to selectively position and induction weld components to sections of the inner surface 26 that are offset from the limited bonding area typically used with conventional welding techniques. The method of the present invention generally includes the steps of securing the component 30 to the holder 52, operating the arm 50 to position the component in the fuel tank, induction welding the component to the fuel tank 20, releasing the component from the holder, and removing the arm and holder from the fuel tank.

The fuel tank 20 includes a wall 22 defining a cavity 21. In the illustrated embodiment, the fuel tank 20 is blow molded. The wall 22 includes the inner surface 26, an outer surface 28, and a permeation resistant layer 27 therebetween (shown in FIG. 3). The access opening 24 extends through the wall 22 and permits insertion and removal of components 30 such as rollover valves, vapor vent valves, fuel pumps, floats, and tubes held by clips. The layers forming the inner and outer surfaces 26, 28 are typically formed from a polymer material such as a polyolefin or other suitable thermoplastic material. The permeation resistant layer 27 is generally formed from a material having a suitable permeation rate such as nylon, -ethylene vinyl alcohol copolymer (EVOH), liquid crystal polymers (LCPs), or other permeation resistant materials. The fuel tank 20 may be formed in a variety of sizes, shapes, and configurations depending on vehicle packaging, safety requirements and other design objectives.

The component 30 includes a weld surface 32 (FIGS. 4 and 5) formed out of a material that is suitable for welding to the inner surface 26 of the fuel tank 20. The shape or configuration of the weld surface 32 may be modified as needed to improve cycle times or provide a more secure weld between the fuel tank 20 and component. As with conventional induction welding assemblies, the assembly 49 of the present invention includes an emitter coil 40 and a receiver 41. The emitter coil 40 is located outside the fuel tank 20 and is positionable within the proximity needed to the area of the tank surface where the component 30 is to be secured. The receiver 41 may be separate from the holder and component, coupled to the holder 52 or arm 30 (FIG. 5), or included in the component itself (FIG. 6). By way of illustration, FIG. 6 shows an induction insert 34, such as a metal coil, fixed to or molded within the component near the weld surface 32, to facilitate melting a portion of the weld surface for bonding to the fuel tank 20. Alternatively, induction particles (not shown) may be added to the component 30, proximate the weld surface in place of the induction insert 34. Integrally molding the induction insert 34 into the component 30 or otherwise fixing the receiver to the component itself eliminates the need to remove any heating element from the tank after welding, thereby improving cycle times. As shown in FIG. 5 and noted above, the component 30 may be made without induction insert 34 or integrally molded induction particles such as by placing the induction receiver 41, such as the illustrated induction element 56 on the holder 52 or arm 50 in close proximity to the weld surface 32.

In the illustrated embodiment, the arm 50 is a robotic arm that articulates to position the component 30. A robotic arm allows position feedback and can follow appropriate instructions in placing the component. Any other device capable of placing the component 30 in a position offset or displaced from the access opening 24 may be used, such as a pick-n-place, fixed jig, or a semi-flexible linkage. The type of arm 50 used may depend on the position of the component. 30.

After the component 30 is attached to the inner surface 26 of the fuel tank 20 additional elements for operation of the component may be assembled as well known in the art for fuel tanks. Multiple components may be bonded to the fuel tank with induction welding. In general, each attached component 30 is attached to the fuel tank 20 at a bond area 14, when the weld surface 32 of the component 30 melts to the inner surface 26 of the fuel tank.

The method of fuel tank assembly will now be described in greater detail. In the illustrated embodiment, the component 30 is secured within the holder 52 on the end of the arm 50. The holder 52 and the arm 50 may be of any configuration capable of holding the component 30 and offsetting the component to the desired position. As shown in FIG. 4, the arm 50 is an articulated arm with the holder 52 at one end. The holder 52 includes an open-ended chamber 51 configured to receive the component 30. As is shown in FIGS. 4-6, the assembly 49 may include a vacuum passage 68 communicating with the chamber 51 as well as biasing elements, such as the illustrated spring assembly 58. A vacuum source or other means of actuation control, schematically illustrated by reference numeral 62, communicates with the passage 68 and is selectively energized to hold the component in the holder 52 while the component 30 is displaced from the opening 24 to the desired position within the fuel tank 20.

The arm 50 and holder 52 typically are inserted through the access opening 24 and displaced to the proper position. As used in this application, the phrases displaced or offset from the access opening is intended to encompass movement of the component within the tank anywhere outside the limited bonding area 12 illustrated in FIG. 2. The limited bonding area 12 is the area on the inner surface 26 opposite the access opening 24 and within view from the access opening where conventional welding mechanisms could possibly operate. By permitting efficient welding of components to areas outside the limited bonding area 12 used in the prior art, the present invention provides numerous mounting options not previously available in the art and corresponding improvements in packaging and performance. Further, displacement of or offsetting the component from the opening allows the component 30 to be welded to the same side of the fuel tank as the access opening 24, as illustrated in FIG. 2.

After the arm 50, holder 52, and component 30 are inserted through the opening and displaced to the proper position, the weld surface 32 of the component 30 is placed in contact with the inner surface 26 of the fuel tank 20. For example, the vacuum or other actuation source may be de-energized to release the vacuum in the chamber 51 whereupon the spring assembly 58 urges the component 30 toward the inner surface 26. With the component 30, specifically the weld surface 32, in contact with the inner surface 26, the component is ready to be welded to the fuel tank.

With the component 30 in place, the induction emitter coil 40 is placed in an opposing relationship to the receiver 41 with the fuel tank wall 22 therebetween (FIGS. 5 and 6). The induction emitter coil 40 may be any system or induction coil well known in the art for use in induction welding. The induction emitter coil 40 may also be disposed in place before the component 30 is displaced to the proper position. The actual position of the emitter coil 40 as well as the size, shape, and configuration may be varied as needed to maximize efficiency of the induction welding. With the emitter coil 40 in place, power is supplied to the induction emitter coil to cause the induction receiver 41, such as the induction insert 34, to increase in temperature. Power is supplied to the emitter coil 40 until the induction insert 34 becomes heated sufficiently for enough time to weld the component 30 to the fuel tank. More specifically, the induction emitter coil 40 causes the induction receiver 56 to increase in temperature so that the thermoplastic material of the component 30 melts to create a bond between the component 30 and inner surface 26 of the fuel tank 20. Induction receivers 56 generally have less mass than, and therefore heat and cool faster than, conventional heating elements, thereby improving cycle times.

With the component 30 welded to the tank, power to the induction emitter coil 40 is interrupted thereby allowing the induction receiver 56, e.g., induction insert 34, to cool. If the component 30 contains the induction insert, the holder 52 and arm 50 may be removed from the fuel tank once the bond area 14 hardens enough to secure the component 30 on the fuel tank 20. If the induction receiver 56 is located in the holder 52, the induction receiver is allowed to cool sufficiently to prevent damage during disengagement of the holder. Further, by using an induction receiver instead of a heating element, power supply cords may be eliminated resulting in a lightweight and controllable arm. Furthermore, induction heating permits a significant heat flux to be applied without the need for the relatively large, preheated masses required for conventional resistive heating elements, thus reducing the likelihood of damaging the fuel tank assembly during insertion and removal of the apparatus.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A method of attaching a component to a fuel tank having a wall defining a tank cavity, an inner surface, an outer surface, and an access opening extending through the wall, the method comprising:
   coupling the component with a holder on an arm;
   inserting the component and holder into the access opening defined by the fuel tank; and
   manipulating the arm to position the component in contact with the inner surface at a location offset from the access opening; and
   inductively welding the component to the inner surface of the fuel tank by an emitter coil disposed exterior of the fuel tank.

2. The method of claim 1 wherein the step of inductively welding the component further includes the steps of:
   energizing the emitter coil to heat an induction receiver positioned in welding proximity to a weld surface of the component to weld the component to the inner surface; and
   de-energizing the induction coil after the component is welded to the fuel tank.

3. The method of claim 1 further comprising the step of biasing the component against the inner surface with a biasing element.

4. The method of claim 3 wherein the step of biasing the component against the inner surface includes a spring assembly disposed within the holder that urges the holder against the inner surface.

5. The method of claim 1 wherein one of the holder and component include an induction receiver in welding proximity to a weld surface of the component and wherein the step of induction welding further includes:
   energizing an emitter coil to heat the induction receiver coupled to the arm; and
   de-energizing the emitter coil after the component is inductively welded to the inner surface of the fuel tank.

6. The method of claim 1 further including manipulating the arm to remove the holder from the fuel tank after inductively welding the component.

7. The method of claim 1 further comprising the step of biasing the component against the inner surface with a biasing element.

8. The method of claim 7 wherein the step of biasing the component against the inner surface includes urging the holder against the inner surface utilizing a spring assembly disposed within the holder.

* * * * *